(12) United States Patent
Gaertner et al.

(10) Patent No.: US 8,699,064 B2
(45) Date of Patent: Apr. 15, 2014

(54) PRINT JOB SCHEDULING IN A PRINT SHOP ENVIRONMENT

(75) Inventors: Joseph P. Gaertner, Lafayette, CO (US); Joan Stagaman Goddard, Boulder, CO (US); Janeen E. Jahn, Lafayette, CO (US); Kumar V. Kadiyala, Boulder, CO (US); Ronald J LeMaster, Boulder, CO (US); Marquis G. Waller, Beverly, OH (US)

(73) Assignee: Ricoh Company, Ltd., Tokyo (JP)

( * ) Notice: Subject to any disclaimer, the term of this patent is extended or adjusted under 35 U.S.C. 154(b) by 211 days.

(21) Appl. No.: 13/032,799

(22) Filed: Feb. 23, 2011

(65) Prior Publication Data

US 2012/0212770 A1 Aug. 23, 2012

(51) Int. Cl.
*G06F 3/12* (2006.01)
(52) U.S. Cl.
USPC .......................... 358/1.15; 358/1.16
(58) Field of Classification Search
CPC .................... G06F 3/1203–3/1205
USPC .................................. 358/1.15, 1.16
See application file for complete search history.

(56) References Cited

U.S. PATENT DOCUMENTS

| | | | | |
|---|---|---|---|---|
| 5,592,654 A | * | 1/1997 | Djakovic | 710/8 |
| 2002/0063884 A1 | * | 5/2002 | Bhogal et al. | 358/1.15 |
| 2007/0229896 A1 | * | 10/2007 | Fujimori et al. | 358/1.16 |
| 2010/0309495 A1 | * | 12/2010 | Nakagawa | 358/1.9 |

* cited by examiner

*Primary Examiner* — Qian Yang
(74) *Attorney, Agent, or Firm* — Duft Bornsen & Fettig LLP (57) ABSTRACT

Methods and systems are provided for scheduling multiple types of print jobs for a printer more efficiently by scheduling jobs together that share print settings. In one embodiment, a system includes a print queue that stores print jobs scheduled for a printer. The system also includes a scheduler that receives requests to schedule a print job for the printer. The scheduler compares the print settings of the requested print job to print settings of the print jobs already in the print queue. The scheduler then schedules the requested print job among the print jobs in the print queue that have print settings corresponding with the print settings of the requested print job.

9 Claims, 11 Drawing Sheets

PRINT JOB SCHEDULING IN A PRINT SHOP ENVIRONMENT

FIELD OF THE INVENTION

The invention relates to the field of printing systems and, in particular, to scheduling print jobs for a printer based on the print settings of the print jobs.

BACKGROUND

Print shops are typically medium or large scale facilities capable of supplying printing services to meet a variety of customer demands. For example, print shops are often used to print documents used for mass-mailing (e.g., customer bills, advertisements, etc). Because print shops engage in printing on a scale that is hard to match, their customer base is usually varied. Print shop clients may therefore include both large institutional clients (e.g., credit card companies and banks), and small clients (e.g., small businesses and churches).

Print shops are generally arranged to print incoming jobs from clients in a way that is economical, yet fast. Thus, print shops often include a number of high-volume printers capable of printing incoming jobs quickly and at high quality. These printers may be managed by operators who can remove paper jams and reload the printers with media. Print shops also typically include post-print devices that are used to process the printed documents of each job (e.g., stackers, staplers, cutters, binders, etc.). Because print shops serve a variety of clients, they are often tasked with printing jobs that have varying printing formats, delivery dates, and media requirements. Print shops therefore often use a centralized print server that coordinates activity between printers of the print shop and clients. The print server schedules incoming jobs and forwards them to the printers they are directed to.

Clients with printing needs communicate with the print shop to send print jobs to a server. The server may then assign the print jobs to a print queue prior to printing the print jobs, or a print operator may assign the print jobs to the print queue. Typically, print jobs are scheduled to a print queue based on an order in which they were added to the print queue. For example, a print queue may have A4 jobs at the front of the queue (i.e., next in the queue to print) followed by a letter job scheduled to print after the A4 job. If an A4 job is added to the print queue, then the A4 job would typically be scheduled at the end of the queue, or in the example, after the letter job. This is known as a First In First Out (FIFO) queue. While this allows for scheduling of print jobs based on the order in which they are added to the print queue, the print operator may be tasked with a number of media changes at the printer as the print jobs are processed in the FIFO order. This makes the print operator's job harder.

SUMMARY

Embodiments described herein allow scheduling of multiple types of print jobs for a printer more efficiently by scheduling jobs together that share print settings. When a request is received to schedule a new print job for a printer, the print settings of the print job are compared with print settings of print jobs already scheduled in a print queue. The new job is then scheduled to coincide with other jobs in the queue that correspond with the print settings of the new job. For example, a print queue may include a group of A4 jobs scheduled to print before a letter job in the queue. When a new A4 job is added to the queue, the new job is scheduled among the A4 jobs instead of after the letter job as in a First In First Out (FIFO) order. By scheduling jobs together instead of in a FIFO order, the media changes needed at the printer for printing the print jobs are reduced.

In one embodiment, a system includes a print queue that stores print jobs scheduled for a printer. The system also includes a scheduler that receives requests to schedule a print job for the printer. The scheduler compares the print settings of the requested print job to print settings of the print jobs already in the print queue. The scheduler then schedules the requested print job among the print jobs in the print queue that have print settings corresponding with the print settings of the requested print job.

In some embodiments, the print queue stores a pseudo job that defines a boundary in the print queue between sets of print jobs that have different print settings. For example, the pseudo job may define a boundary in the print queue between sets of A4 print jobs and sets of letter print jobs. In this embodiment, the scheduler may schedule a new print job for the printer after the pseudo job depending on the print settings of the new print job. For example, if the printer is currently printing A4 jobs, then the new letter job may be scheduled after the pseudo job that defines a boundary in the queue between A4 jobs and letter jobs.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

The DESCRIPTION OF THE EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
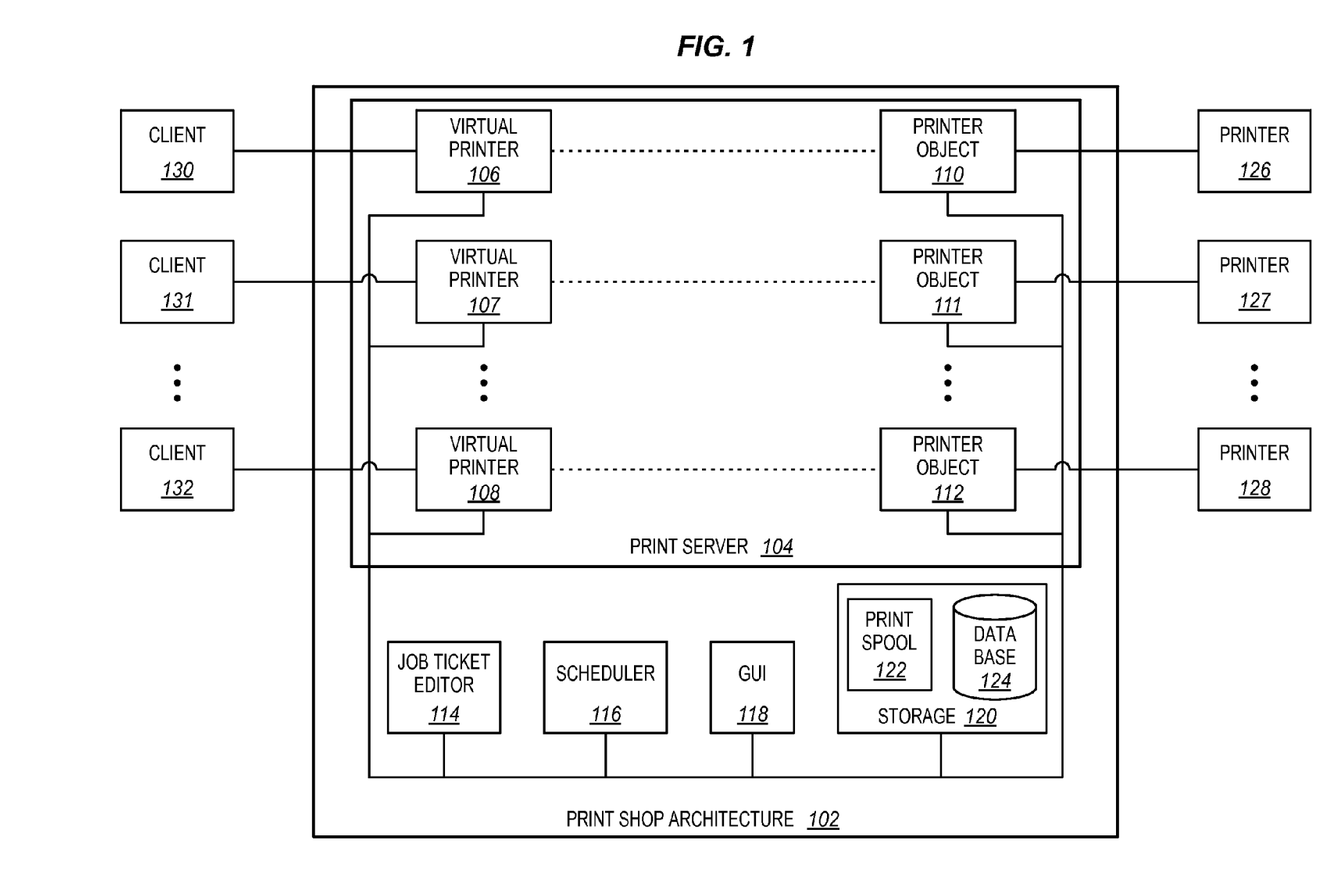
FIG. 1 is a block diagram illustrating a print shop architecture in an exemplary embodiment.

FIG. 1 is a block diagram illustrating a print shop architecture 102 in an exemplary embodiment. Architecture 102 couples one or more clients 130-132 to one or more printers 126-128 to provide printing and print workflow services to clients 130-132. Architecture 102 is operable to receive print jobs and job tickets from clients 130-132 for printing on printers 126-128. Clients 130-132 may include banks, credit card companies, or other entities with printing needs (e.g., monthly bank statements, monthly credit card bills, etc.) Architecture 102 may receive print jobs from clients 130-132 in a number of different formats, such as Portable Document Format (PDF), Mixed Object: Document Content Architecture (MO:DCA), etc. Job tickets may be received from clients 130-132 in a number of different formats, such as Job Definition Format (JDF), Print Production Format (PPF), Portable Job Ticket Format (PJTF), etc. Printers 126-128 include systems for transforming print data onto a suitable printable medium, such as paper, and generally are large production printing systems for high volume printing.

Architecture 102 includes a print server 104 having one or more virtual printers 106-108. Virtual printers 106-108 communicate with clients 130-132 and provide an interface similar to a printer driver to allow clients 130-132 to set up print jobs and send print jobs (and a job ticket associated with the print job) to architecture 102. When clients 130-132 send print jobs and job tickets to architecture 102, the job tickets are scanned into a database 124 located in storage 120 of architecture 102. The print jobs are then stored in a print spool 122 of storage 120 as open jobs prior to queuing the print jobs for printing. A scheduler 116 identifies the open jobs located in print spool 122 and attempts to schedule the jobs at a queue of one or more printer objects 110-112. Typically, scheduler 116 attempts to schedule the open jobs at one of printer objects 110-112 corresponding with virtual printers 106-108 that received the print job. For example, if client 130 transmitted the print job to virtual printer 106, then scheduler 116 may first attempt to place the print job at a print queue of printer object 110. Generally, printer objects 110-112 interface with corresponding printers 126-128 to queue and process print jobs prior to transmitting the jobs to printers 126-128.

A print operator may use a Graphical User Interface (GUI) 118 of architecture 102 to control and identify the status of jobs at architecture 102. For example, GUI 118 may provide a list of print jobs in queues of printer objects 110-112 and other general information about the status of open jobs in print spool 122.

The print operator may also use a job ticket editor 114 to modify job tickets associated with both open and queued print jobs. Using job ticket editor 114, the print operator may modify job tickets to change various print options for a print job associated with the job ticket, such as duplexing, stapling, media type, etc. Architecture 102 provides a number of printing and workflow services to clients 130-132 which will become more readily apparent through the following discussion and related figures.

Figure 2:
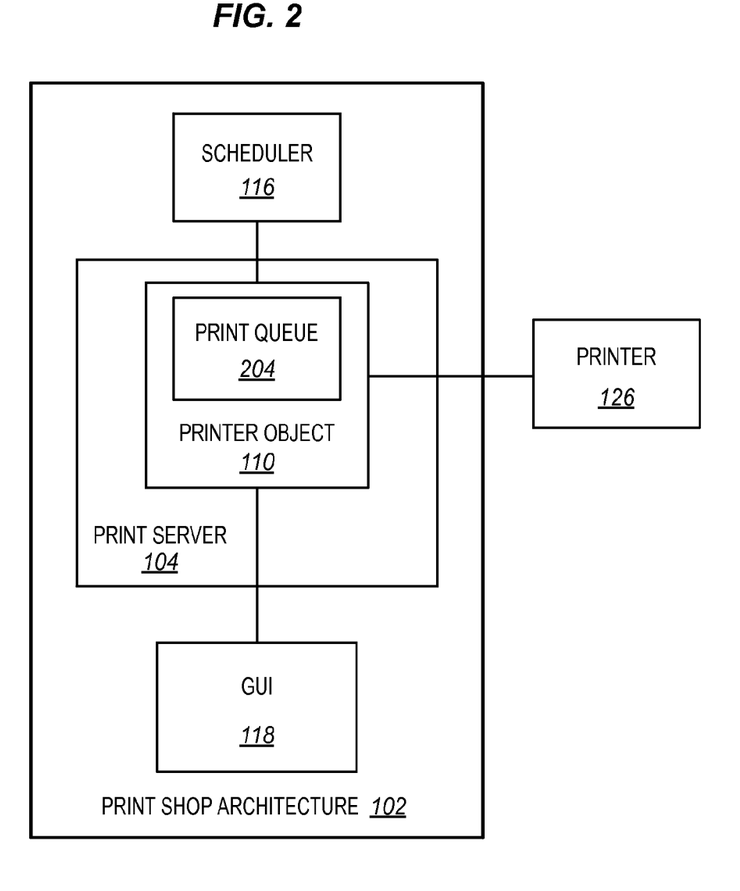
FIG. 2 is a block diagram illustrating additional details for the architecture of FIG. 1 in an exemplary embodiment.

FIG. 2 is a block diagram illustrating additional details for architecture 102 of FIG. 1 in an exemplary embodiment. In like manner to FIG. 1, architecture 102 of FIG. 2 includes print server 104 and GUI 118. Also illustrated in print server 104 is a print queue 204 of printer object 110 that stores print jobs scheduled for printer 126. Although only one print queue 204 for printer 126 is shown in this embodiment, print server 104 may include multiple queues for multiple printers.

Scheduler 116 analyzes the print settings of new print jobs for printer 126, and the print settings of print jobs already scheduled for printer 126. Scheduler 116 then queues the new print jobs among the print jobs already scheduled for printer 126 such that their print settings correspond with each other. When the print jobs are scheduled together based on their print settings, the printing process is more efficient. Details about how scheduler 116 may operate are shown in more detail with respect to FIGS. 3-8.

Figure 3:
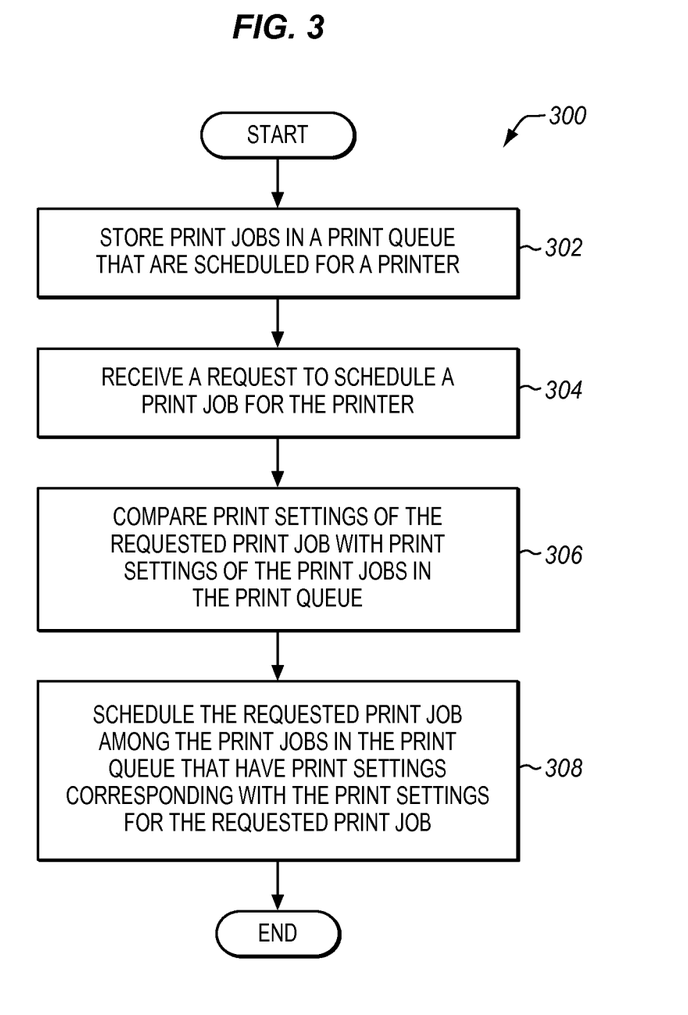
FIG. 3 is a flow chart illustrating a method of scheduling print jobs for a printer in an exemplary embodiment.

FIG. 3 is a flow chart illustrating a method 300 of scheduling print jobs for a printer in an exemplary embodiment. The steps of method 300 will be described with respect to architecture 102 of FIG. 2, although one skilled in the art will understand that method 300 may be performed by other systems not shown. The steps of method 300 described herein are not all inclusive and may include other steps not shown. The steps for the flow charts shown herein may also be performed in an alternative order.

Figure 4:
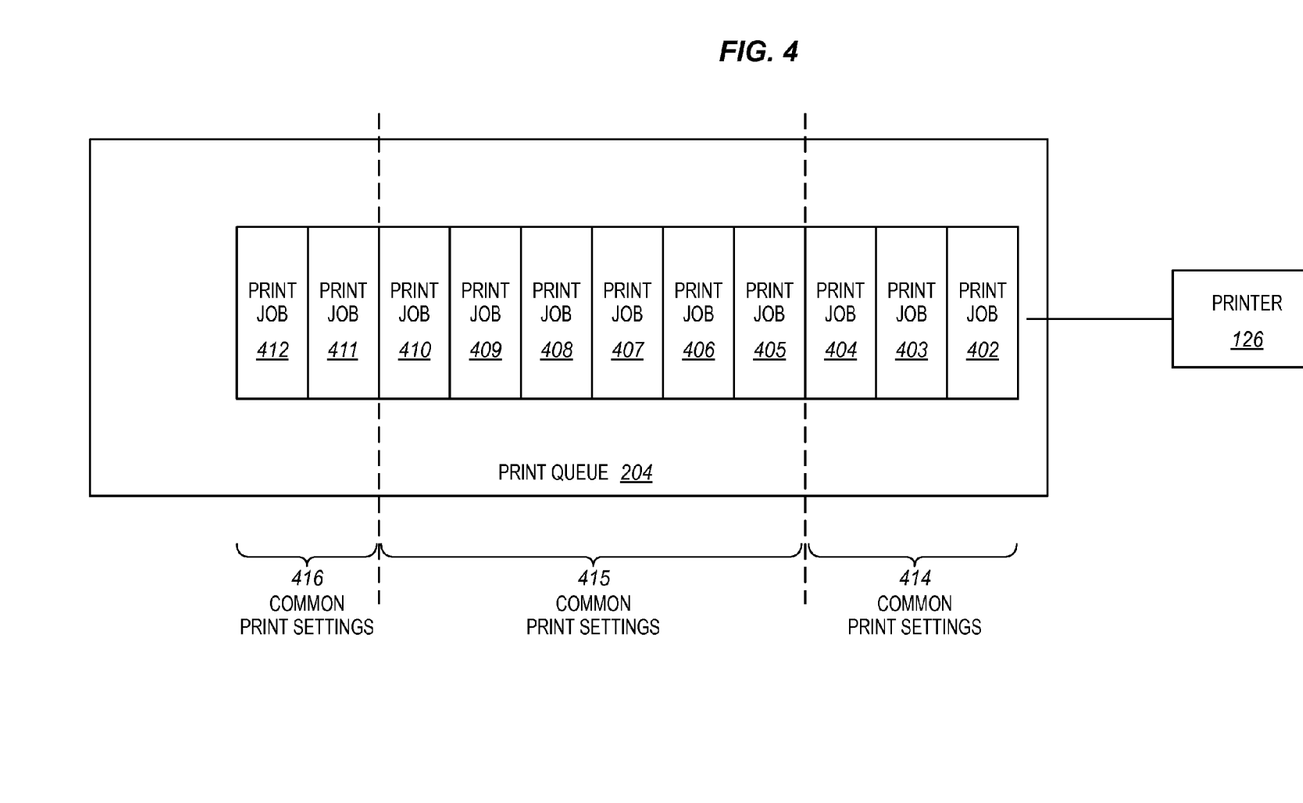
FIG. 4 is a block diagram illustrating print jobs that are scheduled for a printer in an exemplary embodiment.
Figure 5:
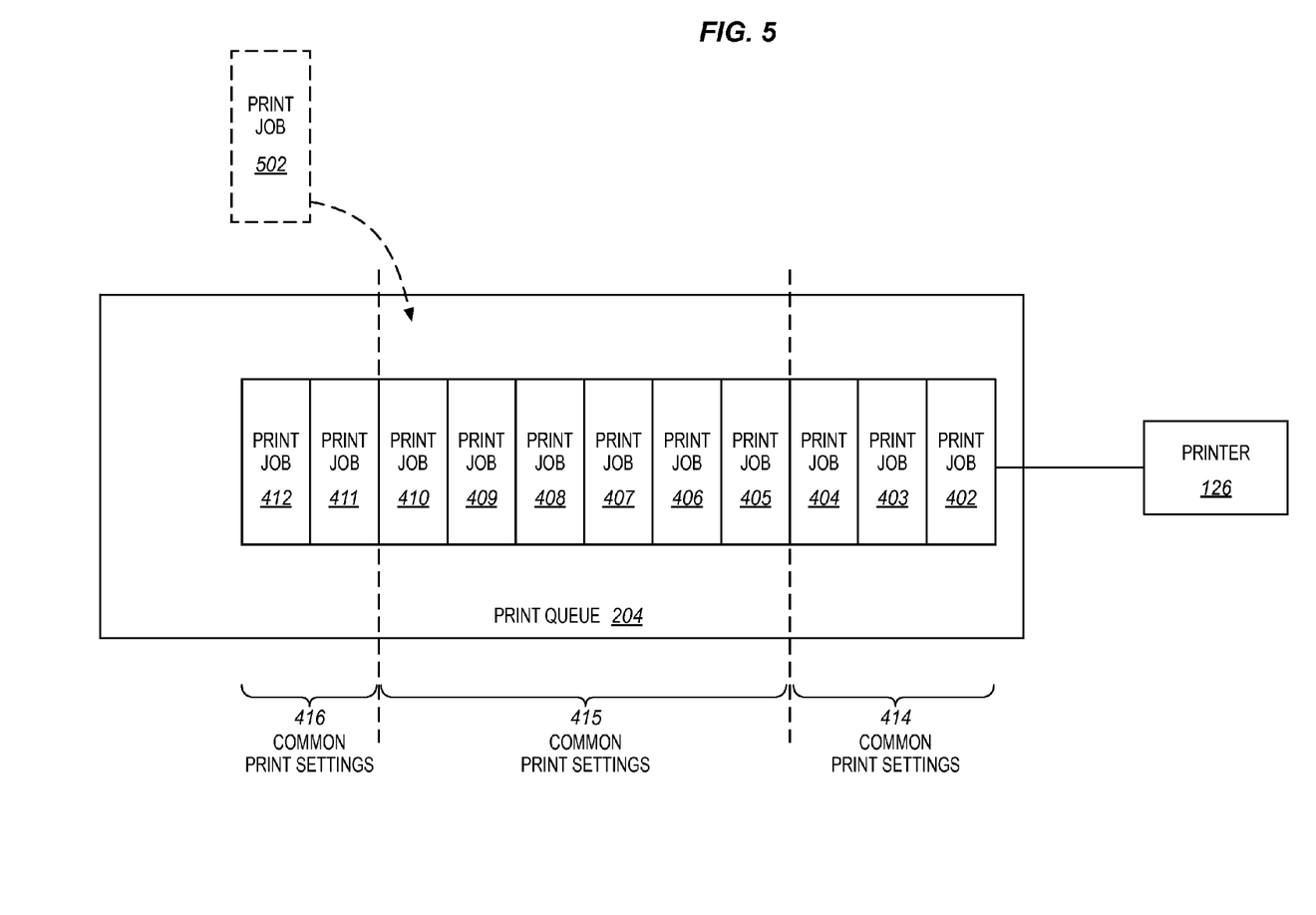
FIG. 5 is a block diagram illustrating an example of a request to schedule a print job for printer in an exemplary embodiment.

In step 302, scheduler 116 stores print jobs in a print queue that are scheduled for a printer. FIG. 4 is a block diagram illustrating print jobs 402-412 that are scheduled for printer 126 in an exemplary embodiment. As shown in FIG. 4, print jobs 402-404 share common print settings 414, print jobs 405-410 share common print settings 415, and print jobs 411-412 share common print settings 416. The dashed lines in FIG. 5 illustrate boundaries between sets of print jobs that have different print settings. The shared print settings may be a type of media (e.g., A4, letter, etc.) and/or a type of post-print action to perform on print jobs 402-412 (e.g., stapling, binding, etc.). The boundaries may be different regions or queue locations within print queue 204. Generally, print jobs stored in print queue 202 that share print properties are scheduled to print together. For example, the boundary between print job 404 and print job 405 may be a boundary between letter jobs and A4 jobs. In this embodiment, common print settings 414-416 are different from each other. Print jobs 402-412 are illustrated in print queue 204 in an expected order in which they will print. Print job 402 is at the front of print queue 202, and therefore is scheduled to print at printer 126 first. Print job 412 is at the end of print queue 202, and therefore is scheduled to print at printer 126 last.

In step 304, scheduler 116 receives a request to schedule a print job for a printer. FIG. 5 is a block diagram illustrating an example of a request to schedule a print job 502 for printer 126 in an exemplary embodiment. The request may be generated by scheduler 116, or received by scheduler 116 from a print operator using GUI 118 to drag and drop a print job to print queue 204 for scheduling at printer 126.

In step 306, scheduler 116 compares the print settings of print job 502 with the print settings of one or more of print jobs 402-412 stored in print queue 204. Scheduler 116 may query database 124 (see FIG. 1) to locate a job ticket for one or more of print jobs 402-412 to determine their print settings, and then compare the job tickets with a job ticket for print job 502.

Figure 6:
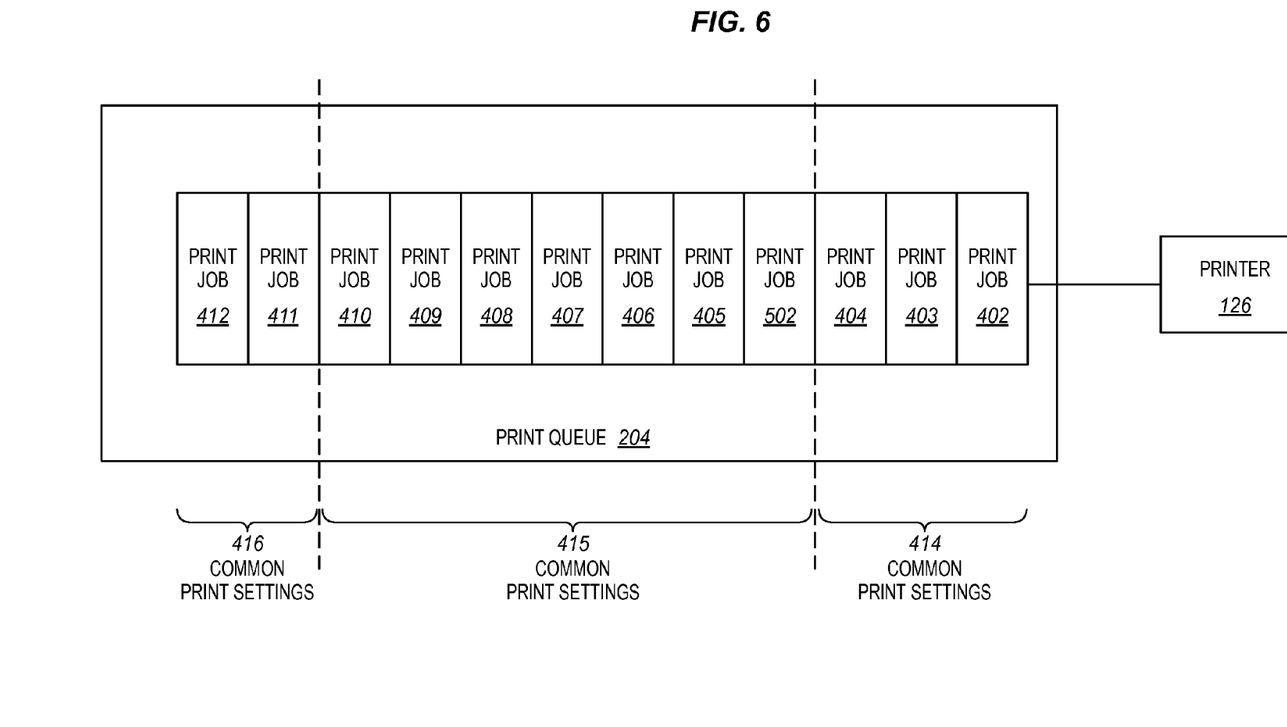
FIG. 6 is a block diagram illustrating an example of how a scheduler of FIG. 2 may schedule print jobs to a printer in an exemplary embodiment.

In step 308, scheduler 116 schedules (queues) print job 502 among print jobs 402-412 in print queue 204 that have print settings corresponding with the print settings for print job 502. In this embodiment, scheduler 116 determines that print job 502 shares print settings with print jobs 405-410, and therefore, schedules print job 502 among print jobs 405-410 in print queue 204. FIG. 6 is a block diagram illustrating an example of how scheduler 116 may schedule print job 502 for printer 126 in an exemplary embodiment. In FIG. 6, print job 502 is scheduled for printer 126 along with print jobs 405-410. Print job 502 may be scheduled to print first out of print jobs 405-410, last, or some queue position in between print job 405 and print job 410. Note in FIG. 6 that print job 405 has been re-scheduled to print after print job 502. The converse may also be true. Print job 502 may be scheduled to print after print job 405.

Figure 7:
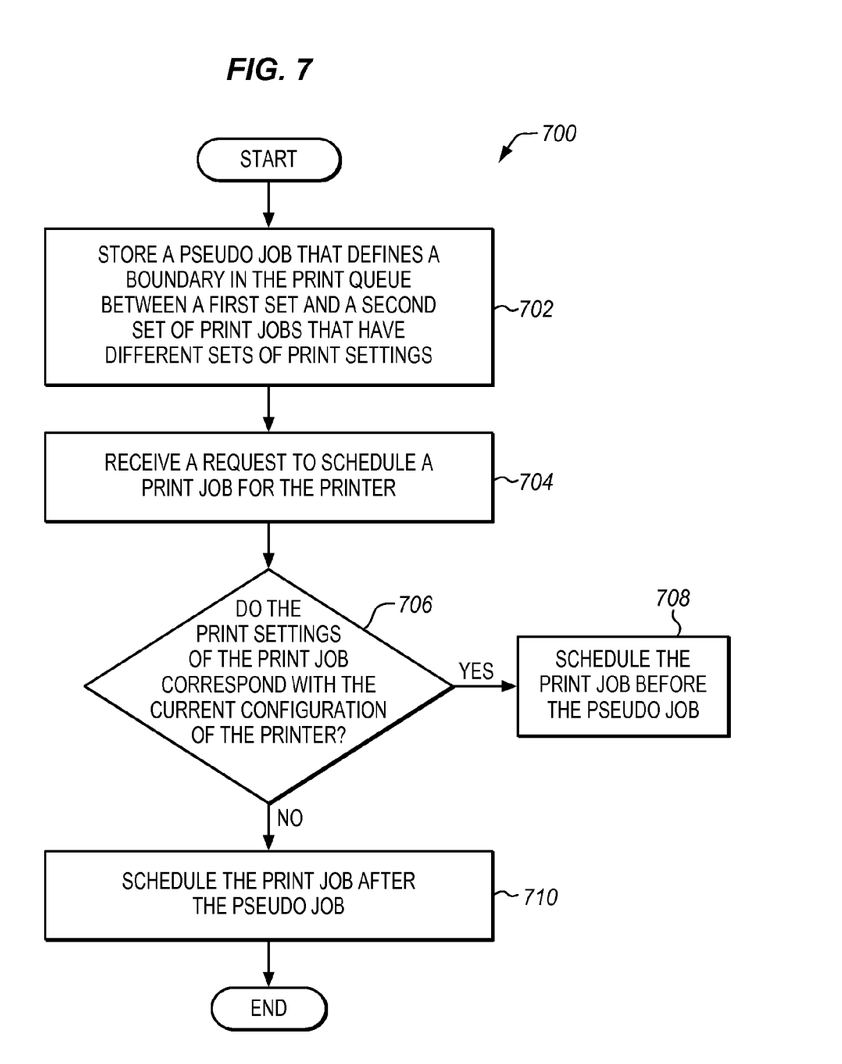
FIG. 7 is a flow chart illustrating another method of scheduling print job for a printer using pseudo jobs in an exemplary embodiment.

FIG. 7 is a flow chart illustrating another method 700 of scheduling print jobs for a printer using pseudo jobs in an exemplary embodiment. The steps of method 700 will be described with respect to architecture 102 of FIG. 2, although one skilled in the art will understand that method 700 may be performed by other systems not shown. The steps of method 700 described herein are not all inclusive and may include other steps not shown.

In step 702, scheduler 116 stores a pseudo job that defines a boundary in a print queue between a first set and a second set of print jobs that have different sets of print settings. A pseudo job is a special type of non-printing job that is added to a print queue to define a boundary in the print queue. Print jobs scheduled before a pseudo job and after a pseudo job have different sets of print settings. For example, a pseudo job scheduled in the print queue may define a boundary between A4 print jobs and letter print jobs scheduled for a printer. Pseudo jobs may also define different regions in the queue between print jobs that have different print settings.

Figure 8:
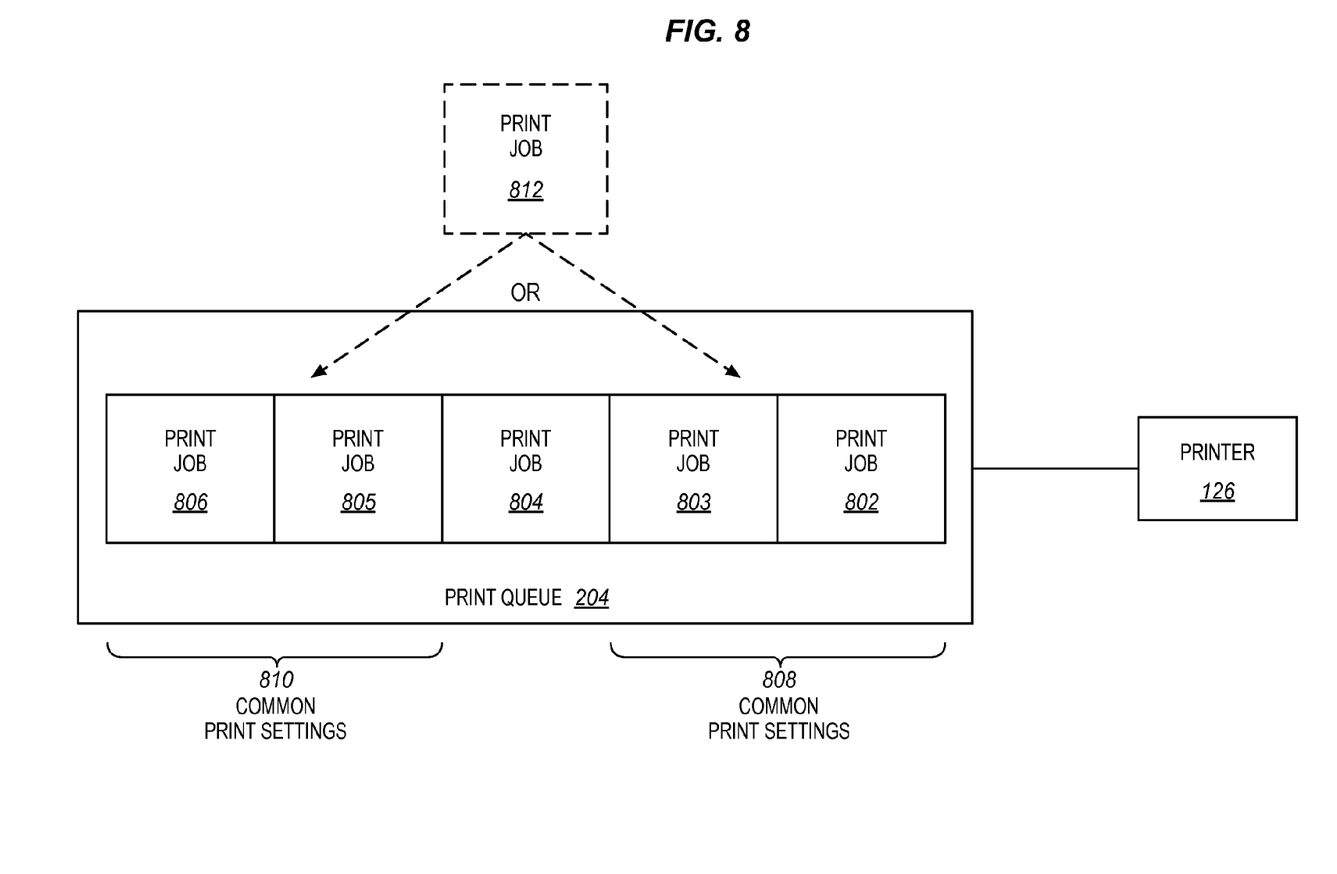
FIG. 8 is a block diagram illustrating an example of how the scheduler of FIG. 2 may store a pseudo job in a print queue to define a boundary in a print queue between print jobs in an exemplary embodiment.

FIG. 8 is a block diagram illustrating an example of how scheduler 116 may store a pseudo job 804 in print queue 204 to define a boundary in print queue 204 between print jobs 802-803 and 805-806 in an exemplary embodiment. In this embodiment, print jobs 802-803 share a common set of print settings 808. Print jobs 805-806 share a different set of print settings 810 as compared to print settings 808. Pseudo job 802 defines the boundary between the print jobs 802-803 and 805-806 in print queue 204. Also, print settings 808 correspond with a current configuration of printer 126 in this embodiment. For example, print settings 808 may specify letter paper for printing jobs 802-803. In the example, printer 126 is configured to print letter jobs. Although only one pseudo job 804 is shown in FIG. 8, print queue 204 may store a plurality of pseudo jobs, each of the pseudo jobs defining boundaries in print queue 204 between print jobs that have different print settings.

In step 704, scheduler 116 receives a request to schedule a print job for a printer. In this embodiment, scheduler 116 receives a request to schedule print job 812 (see FIG. 8) for printer 126. In step 706, scheduler 116 compares the print settings for print job 812 with the print settings 808 and 810 for print jobs 802-803, and 805-806, respectively. If the print settings for print job 812 correspond with the current configuration of printer 126, then print job 812 is scheduled before pseudo job 804. In other words, print job 812 is scheduled among print jobs 802-803. Print job 812 may be scheduled to print first, second, or third in print queue 204 as a matter of design choice. For example, if print job 812 is scheduled to print first in print queue 204, then print job 802 prints after print job 812. In the example, print job 803 prints after print job 802.

If scheduler 116 determines in step 706 that the print settings for print job 812 do not correspond with the current configuration of the printer (e.g., the print settings for print job 812 correspond with print settings 810), then print job 812 is scheduled after pseudo job 804. In other words, print job 812 is scheduled among print jobs 805-806. Print job 812 may be scheduled to print third, fourth, or fifth in print queue 204. For example, if print job 812 is scheduled to print last in print queue 204, then print jobs 802-803 and 805-806 print before print job 812.

EXAMPLE

Figure 9:
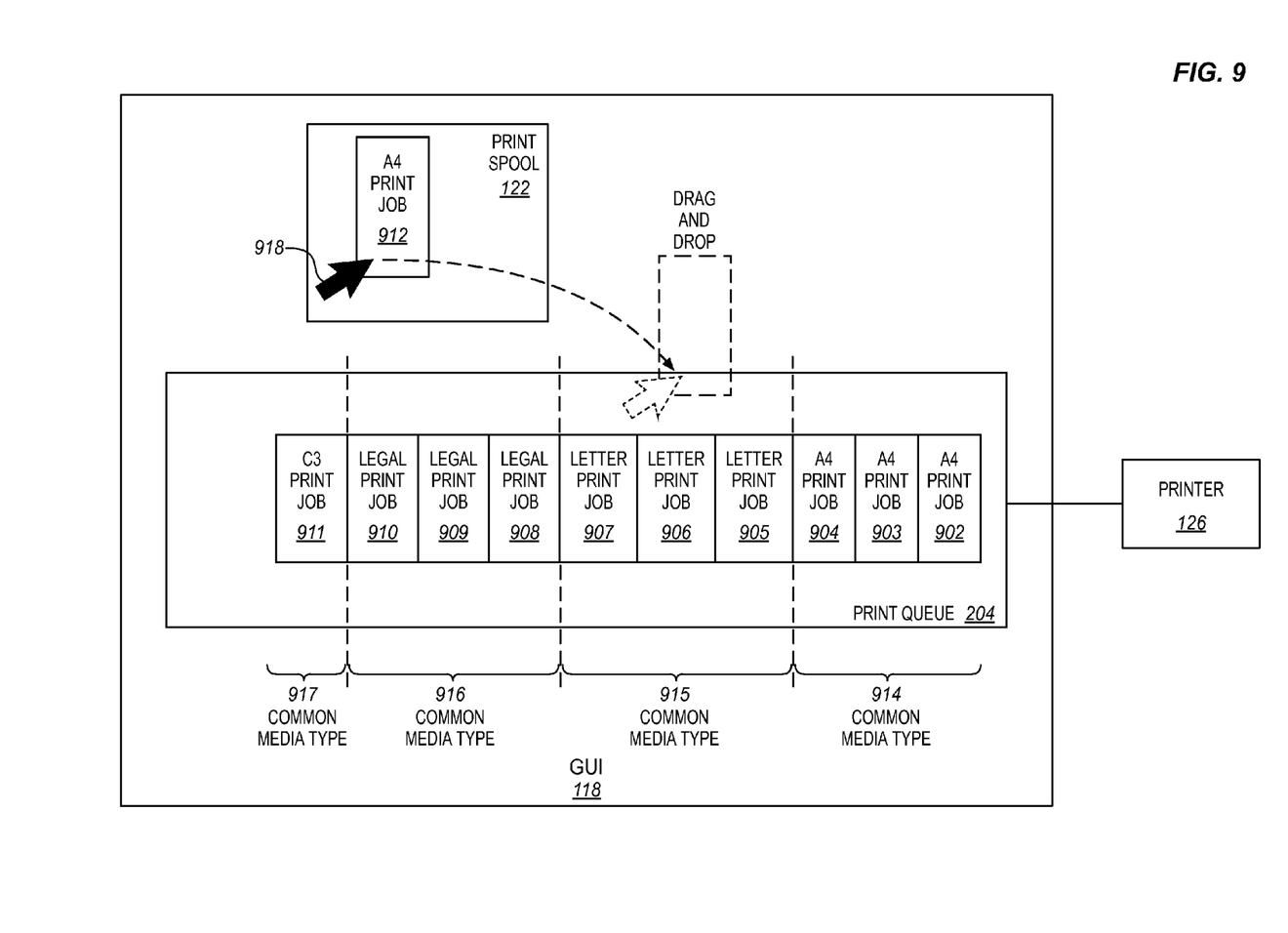
FIG. 9 is a block diagram illustrating a drag and drop example for scheduling a print job for a printer in an exemplary embodiment.

In the example, consider that a print operator desires to move an A4 print job from print spool 122 (see FIG. 1) to a print queue for a printer. FIG. 9 is a block diagram illustrating a drag and drop example for scheduling a print job 912 for printer 126 in an exemplary embodiment. Using GUI 118 of architecture 102 a print operator may use a pointer 918 (e.g., via a mouse, trackball, or another pointing device) to drag print job 912 from a graphical representation of print spool 122 to a graphical representation of print queue 204. In the example, print job 912 is an A4 job. Print queue 204 includes print jobs 902-904 that are A4 media type jobs (illustrated by media type 914), print jobs 905-907 that are letter media type jobs (illustrated by media type 915), print jobs 908-910 that are legal media type jobs (illustrated by media type 916), and a print job 911 that is a C3 print media type print job (illustrated by media type 917).

In the example a print operator desires to schedule print job 912 at printer 126. To do so, the print operator uses pointer 918 to select print job 912 (e.g., via a mouse button), and drag print job 912 to a representation of print queue 204. In the example, the print operator drags print job 912 into the representation of print queue 204 and drops print job 912. In response to the print operator dropping print job 912 into the representation of print queue 204, scheduler 116 (see FIG. 1) performs a number of steps to determine where to schedule print job 912 among print jobs 902-911 that are already scheduled for printer 126. Scheduler analyzes a media type for print job 912 (A4 in the example), and analyzes the media types for print jobs 902-911. In the example, print job 912 shares a media type with print jobs 902-904. Thus, scheduler will queue or schedule print job 912 among print jobs 902-904. Scheduler 116 may queue print job 912 first, second, third, or fourth to print in print queue 204. In some cases a priority of the new print job 912 scheduled for printer 126 determines where among print jobs 902-904 print jobs 912 is scheduled. Print job 912 may be a high priority job that is scheduled to print first among print jobs 902-904.

Figure 10:
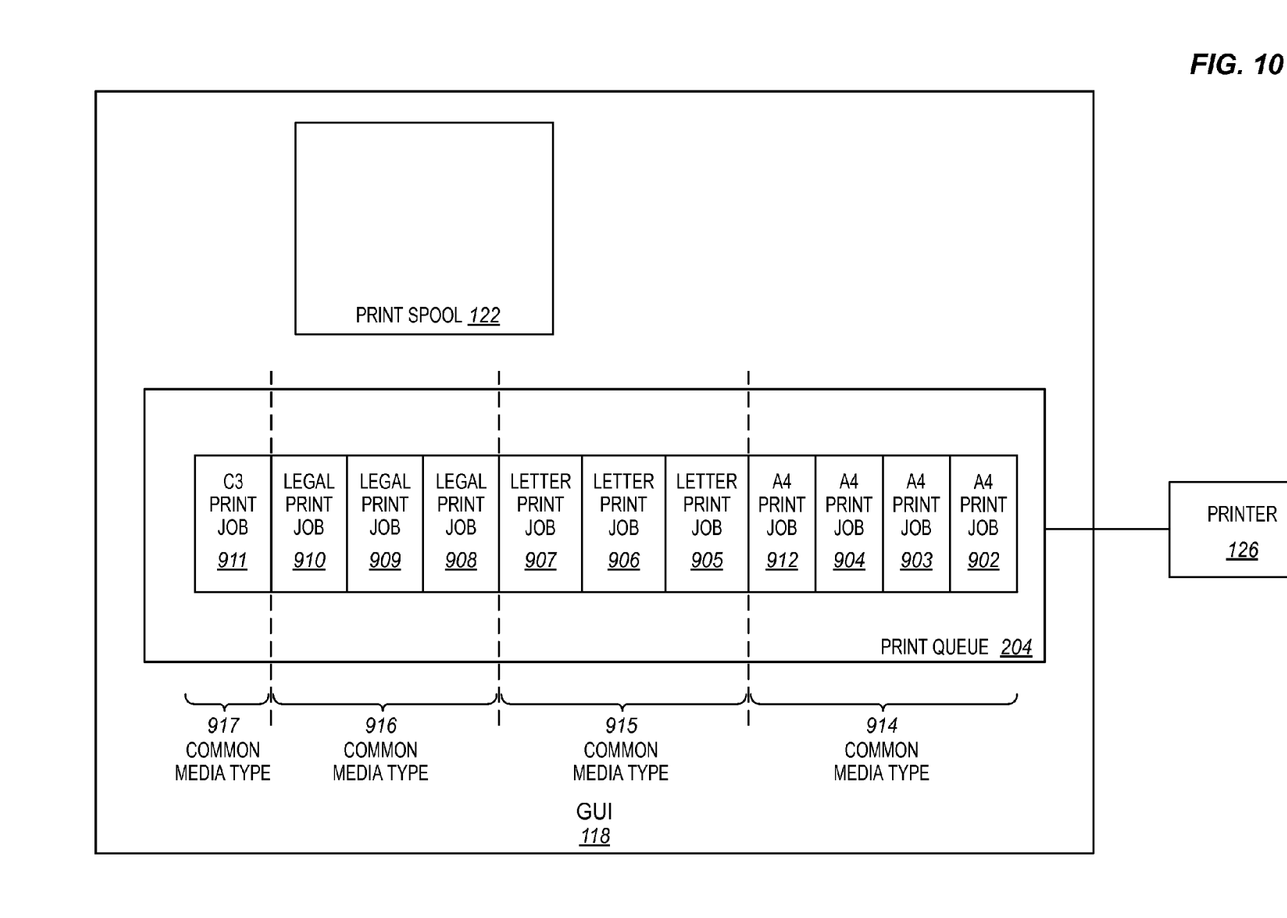
FIG. 10 is a block diagram illustrating the result of the drag and drop example in an exemplary embodiment.

FIG. 10 is a block diagram illustrating the result of the drag and drop example in an exemplary embodiment. In FIG. 10, print job 912 is scheduled for printer 126 among print jobs 902-904. More particularly, print job 912 is scheduled to print after print jobs 902-904 in FIG. 10. Print job 912 may be scheduled last among print jobs 902-904 when print job 912 has a lower priority than print job 902-904.

Figure 11:
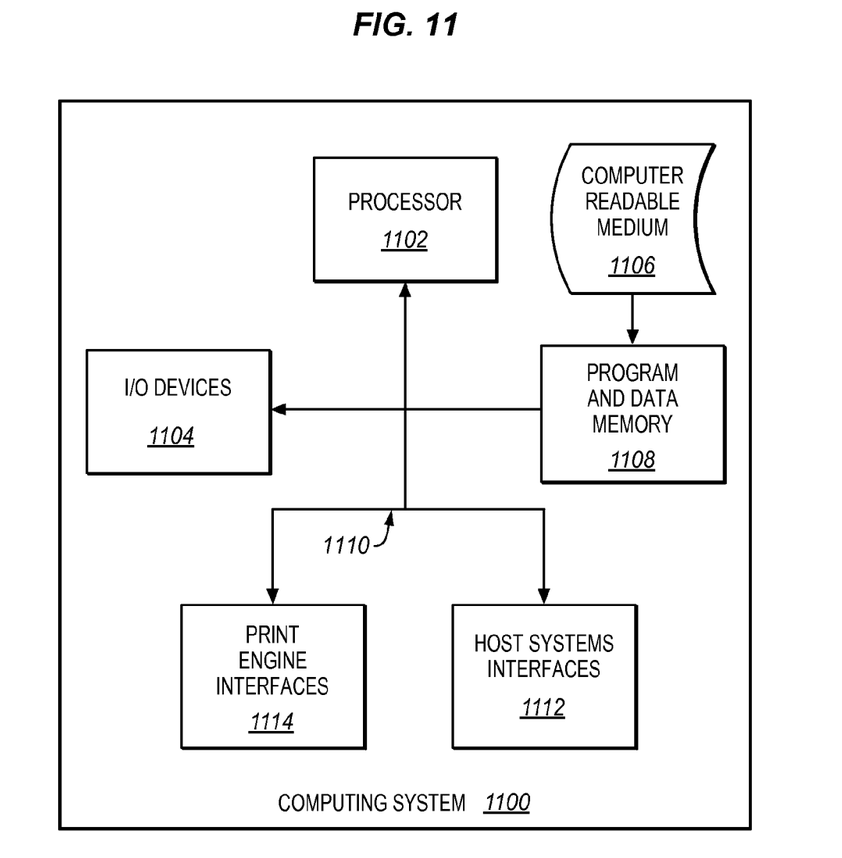
FIG. 11 illustrates a computer system operable to execute computer readable medium embodying programmed instructions to perform desired functions in an exemplary embodiment.

The invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 11 illustrates a computing system 1100 in which a computer readable medium 1006 may provide instructions for performing methods 300 and 700 in an exemplary embodiment.

Furthermore, the invention can take the form of a computer program product accessible from a computer-usable or computer-readable medium 1106 providing program code for use by or in connection with a computer or any instruction execution system. For the purposes of this description, a computer-usable or computer readable medium 1006 can be any apparatus that can contain, store, communicate, propagate, or transport the program for use by or in connection with the instruction execution system, apparatus, or device.

The medium 1106 can be an electronic, magnetic, optical, electromagnetic, infrared, or semiconductor system (or apparatus or device) or a propagation medium. Examples of a computer-readable medium 1106 include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code includes at least one processor 1102 coupled directly or indirectly to memory 1108 through a system bus 1110. The memory 1108 can include local memory employed during actual execution of the program code, bulk storage, and cache memories which provide temporary storage of at least some program code in order to reduce the number of times code is retrieved from bulk storage during execution.

Input/output or I/O devices 1104 (including but not limited to keyboards, displays, pointing devices, etc.) can be coupled to the system either directly or through intervening I/O controllers.

Network adapters may also be coupled to the system to enable the data processing system to become coupled to other data processing systems, such a through host systems interfaces 1112, or remote printers or storage devices through intervening private or public networks, such as through print engine interfaces 1114. Modems, cable modem and Ethernet cards are just a few of the currently available types of network adapters.

Although specific embodiments were described herein, the scope of the invention is not limited to those specific embodiments. The scope of the invention is defined by the following claims and any equivalents thereof.

We claim:

1. A system comprising:
   a print queue operable to store print jobs scheduled for a printer, and to store a non-printing pseudo job that defines a boundary in the print queue between a first set of print jobs and a second set of print jobs having different media types; and
   a scheduler operable to receive a request to schedule a print job for the printer, to compare a media type of the requested print job with media types of the print jobs in the print queue, and to:
   schedule the requested print job in the print queue before the pseudo job responsive to determining that the media type of the requested print job corresponds with media loaded at the printer; and
   schedule the requested print job in the print queue after the pseudo job responsive to determining that the media type of the requested print job does not correspond with the media loaded at the printer.

2. The system of claim 1 wherein:
   the print queue is further operable to store another pseudo job that defines another boundary in the print queue between the second set of print jobs and a third set of print jobs, wherein the second set and the third set of print jobs have different media types.

3. The system of claim 1 wherein:
   the scheduler is further operable to schedule the requested print job among print jobs in the print queue that share a common post-print action.

4. A method comprising:
   storing print jobs in a print queue that are scheduled for a printer;
   storing a non-printing pseudo job that defines a boundary in the print queue between a first set of print jobs and a second set of print jobs having different media types;
   receiving a request to schedule a print job for the printer;
   comparing a media type of the requested print job with media types of the print jobs in the print queue;
   scheduling the requested print job in the print queue before the pseudo job responsive to determining that the media type of the requested print job corresponds with media loaded at the printer; and
   scheduling the requested print job in the print queue after the pseudo job responsive to determining that the media type of the requested print job does not correspond with the media loaded at the printer.

5. The method of claim 4 wherein further comprising:
   storing another pseudo job that defines another boundary in the print queue between the second set of print jobs and a third set of print jobs scheduled for the printer, wherein the second set and the third set of print jobs have different media types.

6. The method of claim 4 further comprising:
   scheduling the requested print job among print jobs in the print queue that share a common post-print action.

7. A non-transitory computer readable medium including programmed instructions which, when executed by a processor, are operable for performing a method of scheduling print jobs for a printer, the method comprising:
   storing print jobs in a print queue that are scheduled for a printer;
   storing a non-printing pseudo job that defines a boundary in the print queue between a first set of print jobs and a second set of print jobs having different media types;
   receiving a request to schedule a print job for the printer;
   comparing a media type of the requested print job with media types of the print jobs in the print queue;
   scheduling the requested print job in the print queue before the pseudo job responsive to determining that the media type of the requested print job corresponds with media loaded at the printer; and
   scheduling the requested print job in the print queue after the pseudo job responsive to determining that the media type of the requested print job does not correspond with the media loaded at the printer.

8. The non-transitory computer readable medium of claim 7 wherein the method further comprises:
   storing another pseudo job that defines another boundary in the print queue between the second set of print jobs and a third set of print jobs scheduled for the printer, wherein the second set and the third set of print jobs have different media types.

9. The non-transitory computer readable medium of claim 7, wherein the method further comprises:
   scheduling the requested print job among print jobs in the print queue that share a common post-print action.

* * * * *